United States Patent [19]
Bernatti

[11] 3,802,712
[45] Apr. 9, 1974

[54] SLIDABLE SPINDLE JOINT

[76] Inventor: Edmo Bernatti, Via del Vivaio 7, Frassine frazione di Mantova, Italy

[22] Filed: Aug. 31, 1971

[21] Appl. No.: 176,566

[30] Foreign Application Priority Data
Sept. 21, 1970 Italy.............................18122/70

[52] U.S. Cl..................................... 279/18, 64/31
[51] Int. Cl........................................... B23b 31/04
[58] Field of Search........ 279/16, 18; 64/31; 287/13

[56] References Cited
UNITED STATES PATENTS

| 1,027,520 | 5/1912 | Blood | 64/31 |
| 2,851,868 | 9/1958 | Larkin | 64/31 |
| 1,377,663 | 5/1921 | Brown et al. | 64/31 |

FOREIGN PATENTS OR APPLICATIONS

| 381,319 | 10/1932 | Great Britain | 279/16 |

Primary Examiner—Gil Weidenfeld
Attorney, Agent, or Firm—Elliott I. Pollock

[57] ABSTRACT

A slidable spindle joint for movably connecting a pair of spindles through a cross provided at each axial end with a recess or tongue complementary to a corresponding tongue or recess in the adjacent end of each spindle, the tongues and recesses being movably connected by balls accommodated in complementary semi-spherical grooves in and between the tongues and recesses.

1 Claim, 4 Drawing Figures

SLIDABLE SPINDLE JOINT

BACKGROUND OF THE INVENTION

This invention relates to a slidable spindle joint of the type that can be used particularly in the construction of slidable tool holder spindles in machine tools for various machining operations such as in drilling machines, multiple boring machines, universal and normal lathes etc., such spindles serving to bring into exact alignment the axis of the tool with the axis of the guide sleeve of the jig or of the hole to be drilled.

To permit sliding, or the radial play permitting sliding, hitherto various systems have been employed in the spindles. In the most common form of construction the spindle is the tool mounting spindle attached to the machine shaft and coupled to the tool-holder spindle through a disc or cross member. The cross member is provided with four radial recesses arranged perpendicularly to one another and slidably receiving two pins secured to the tool mounting spindle on the same radial line, and two further pins secured to the base of the tool-holder spindle. Thus a slidable coupling is obtained between the two spindles, and the pins slide independently of one another in the recesses of the cross member.

The parts are held together by a threaded ring or sleeve which serves to limit the extent of sliding. Further, resilient return means are provided to maintain the spindles in a coaxially aligned position in the rest position, i.e., when they are not biased in some other way.

To ensure a perfect and easy sliding movement, which is essential for efficient operation of such joints particularly when they are used with a high number of r.p.m., friction between contacting parts may be reduced by the interposition of balls between the bases and sleeves on the pivots.

In another conventional form of construction the spindles are connected by oscillating joints which permit the spindles to be constructed with less diametral dimensions than in the previously described spindles.

All these conventional spindle joints and other still less efficient can only be used with predetermined diametral dimensions and they are relatively expensive due to their complicated construction and large number of component parts.

It is therefore an object of the present invention to provide a slidable spindle joint which is composed of a relatively small number of component parts and thus inexpensive.

Another object of the present invention is to provide a slidable spindle joint which ensures easy sliding movement between contacting parts due to the use of balls therebetween.

Another object of the invention is to provide a slidable spindle joint of sturdy construction and limited diametral dimensions in relation to its required performance.

SUMMARY OF THE INVENTION

In a preferred embodiment of the invention the slidable spindle joint is formed of three parts, namely a tool mounting spindle, a cross member in the form of a cylinder, and a toolholder spindle. These three parts are slidably coupled to one another by radial tongues provided on the base of the connecting end of each spindle and corresponding recesses on the adjacent base of the cross member, the tongues and recesses extending perpendicularly to one another, i.e., the tongue at the end of the tool mounting spindle extends perpendicularly to the tongue at the end of the toolholder spindle and the recess at the axial end of the cross member adjacent the tool mounting spindle extends perpendicularly to the recess at the axial end of the cross member adjacent the toolholder spindle. Obviously the tongues and recesses may also be arranged in inverse positions, i.e., with the tongues being on the cross member and the recesses being on the ends of the spindles. On the sides of the tongues and recesses hemispherical complementary grooves extend over the entire length of the tongues and recesses to form four holes (two for each tongue and associated recess) receiving balls which movably connect the tongues and recesses and thus the spindles to the cross member.

A sleeve is firmly secured to the cross member and serves to retain the balls within the grooves and to limit the extent of sliding. Further, resilient reference and return means are provided to return the two attachment faces to a coaxially aligned position in the rest position of the joint.

BRIEF DESCRIPTION OF THE DRAWINGS

Two preferred embodiments of the invention will now be described by way of example and with reference to the accompanying drawing, in which.

DESCRIPTION OF THE PREFERRED EMBODIMENTS

Figure 1:
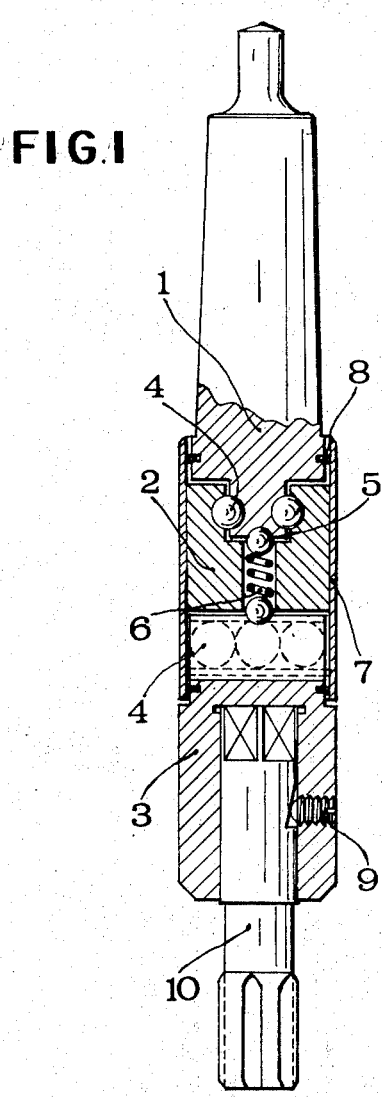
FIG. 1 is a part sectional view of a first embodiment of a slidable spindle joint according to the invention, having limited diametral dimensions.
Figure 3:
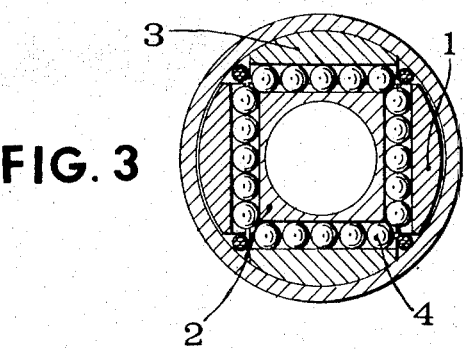
FIG. 3 is a section taken on the line I—I in FIG. 2.
Figure 2:
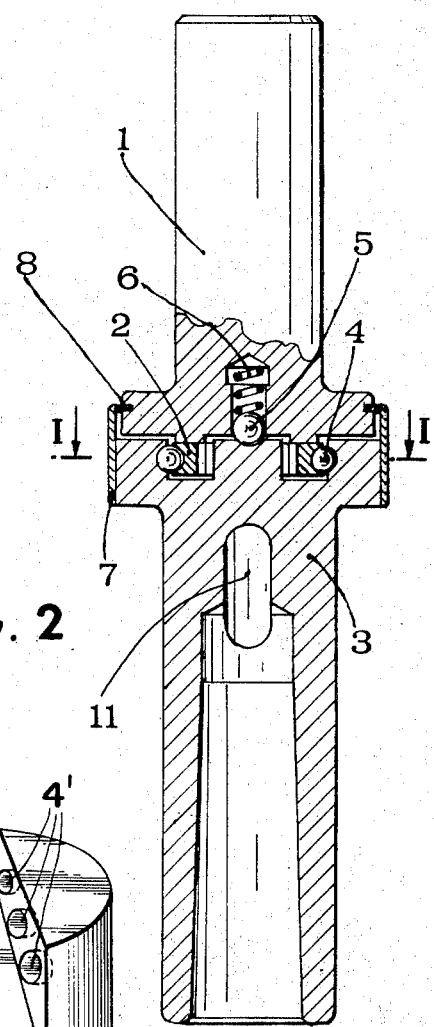
FIG. 2 is a similar part sectional view of another embodiment of slidable spindle joint of larger diametral dimensions.

The spindles of FIGS. 1 and 2 may be used for multi-spindle or single-spindle machine tools.

In all FIGS. of the drawings like elements are indicated by like reference numerals. The tool and tool mounting spindles are merely shown by way of example and may also have any other form different from that shown in the drawing.

Referring more particularly to FIGS. 1 and 2, a tool mounting spindle is indicated by 1 and is provided at its front end with a tongue adapted to be inserted into a corresponding recess in a cross member 2, the tongue being shown from its small side in FIG. 1. The cross member recess and the tongue are provided respectively with complementary hemispherical grooves which match one another to form cylindrical holes (see FIG. 5) accommodating two pairs of parallel rows of balls 4 serving to connect the two parts in a manner permitting a relative radially sliding movement therebetween. A toolholder spindle 3 is coupled to the cross 2 in the same way as the tool mounting spindle 1. A sleeve 7 is provided to retain the balls 4 in position within the grooves and to limit the degree of sliding. The sleeve 7 may be fabricated of a plastics material having a resilience sufficient to permit oscillating movement between the cross and spindles.

FIG. 1 shows two balls 5 urged by a spring 6 into a central hole provided in each of the two spindles 1 and 3 to align the two spindles coaxially in the rest position.

A setscrew 9 serves for locking the tool 10 in position and the various balls are protected by a gasket 8.

Figure 4:
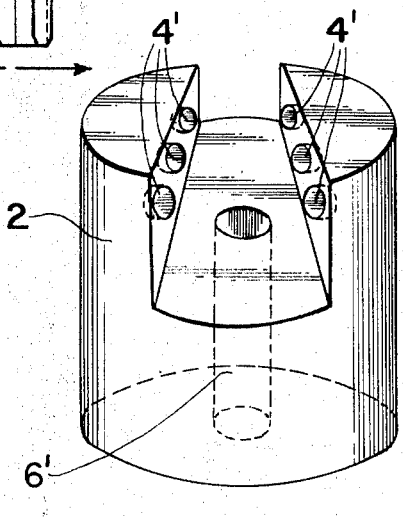
FIG. 4 is a non-axonometric perspective view of the cross member used in the joint of the present invention.

The cross member 2 is depicted, in non-axonometric perspective, in FIG. 4, the perspective view being taken from a point located outside cross member 2 above the horizontal plane of the upper circular surface of member 2 on the median longitudinal plane of the groove therein. The groove is provided with six seats 4' for reception of the balls 4, and the member is further provided with a central hole 6' adapted to receive the spring 6.

In FIG. 2 elastic annular two gaskets 8 are shown which in addition to protecting the balls 4 perform the coaxial alignment function of the balls 5 of FIG. 1. Element 11 is a pin for the extraction of the tool.

The invention may be embodied in other specific forms without departing from the spirit or essential characteristics thereof. The present embodiments are therefore to be considered in all respects as illustrative and not restrictive, the essence of the invention consisting only in a slidable spindle joint having a tongue at the end of one of the spindles and a complementary recess at an adjacent end of the other spindle and balls inserted between the tongue and recess to slidably connect the two spindles.

I claim:

1. A slidable spindle joint comprising a first spindle having a first tongue at one end thereof, a second spindle coaxial with said first spindle and having a second tongue at the end thereof facing said first tongue, a cross member disposed between said two spindles, said cross member having a recess at each end thereof adapted to receive said first and second tongues respectively, two pairs of parallel rows of balls disposed between said tongues and recesses, one of said pairs of parallel rows of balls extending perpendicularly to one another, each of said first and second tongues including a semispherical recess in the end face thereof, said cross member including a central axial hole extending therethrough, a spring disposed within said hole, and a pair of balls disposed respectively at the opposing ends of said spring and urged by said spring into the semispherical recesses provided respectively in the end faces of said first and second tongues of said first and second spindles.

* * * * *